US008379540B2

(12) United States Patent
Gill et al.

(10) Patent No.: US 8,379,540 B2
(45) Date of Patent: Feb. 19, 2013

(54) SYSTEM FOR SYNCHRONOUS AND ASYNCHRONOUS GAMING MODES

(75) Inventors: Timothy S. Gill, Seattle, WA (US); Arnold Blinn, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 12/772,813

(22) Filed: May 3, 2010

(65) Prior Publication Data

US 2011/0269546 A1    Nov. 3, 2011

(51) Int. Cl.
H04L 12/26 (2006.01)
H04L 12/56 (2006.01)
A63F 13/12 (2006.01)
G06F 17/00 (2006.01)
G06F 19/00 (2011.01)

(52) U.S. Cl. ........ 370/254; 370/235; 709/203; 709/228; 463/42

(58) Field of Classification Search ................. 370/229, 370/235, 252, 254, 431, 437; 709/203, 228; 463/1, 42
See application file for complete search history.

(56) References Cited

U.S. PATENT DOCUMENTS

| | | | |
|---|---|---|---|
| 6,241,612 B1 | 6/2001 | Heredia | |
| 6,341,353 B1 | 1/2002 | Herman et al. | |
| 7,431,651 B2 * | 10/2008 | Yamana et al. | 463/42 |
| 7,640,300 B2 | 12/2009 | Wohlgemuth et al. | |
| 7,828,650 B2 * | 11/2010 | Kula | 463/29 |
| 8,078,896 B2 * | 12/2011 | Karlsson | 713/323 |
| 2003/0236907 A1 * | 12/2003 | Stewart et al. | 709/231 |
| 2005/0216529 A1 | 9/2005 | Ashtekar et al. | |
| 2006/0287106 A1 | 12/2006 | Jensen | |
| 2009/0163272 A1 * | 6/2009 | Baker et al. | 463/29 |
| 2009/0280907 A1 | 11/2009 | Larsen et al. | |
| 2010/0160038 A1 * | 6/2010 | Youm et al. | 463/29 |

OTHER PUBLICATIONS

Baughman, "Cheat-Proof Playout for Centralized and Peer-to-Peer Gaming", IEEE/ACM Transactions on Networking , Feb. 2007, pp. 1-13, vol. 15, Issue 1, IEEE Press, Piscataway, NJ, USA.

Zimmerman, "Constructing Client-Server Multi-Player Asynchronous Networked Games Using a Single-Computer Model", Technical Report: 00000167, Aug. 1, 1997, California Institute of Technology, Pasadena, CA, USA.

Bharambe, "Donnybrook: Enabling Large-Scale, High-Speed, Peer-to-Peer Games", Applications, Technologies, Architectures, and Protocols for Computer Communication, Proceedings of the SIGCOMM '08, Aug. 17-22, 2008, pp. 389-400, ACM, New York, NY, USA.

Akesson, "Integrated Project on Pervasive Gaming", WorkPackage WP11: Deliverable D11.8: Final Report, May 11, 2007, 22 pages.

Ferretti, "Interactivity Maintenance for Event Synchronization in Massive Multiplayer Online Games", Technical Report UBLCS-2005-05, Mar. 2005, Department of Computer Science, University of Bologna.

Toyama, Kentaro, et al., "Probabilistic Tracking in a Metric Space," Eighth International Conference on Computer Vision, Vancouver, Canada, vol. 2, Jul. 2001, 8 pages.

* cited by examiner

*Primary Examiner* — Chi Pham
*Assistant Examiner* — Ahmed Elallam
(74) *Attorney, Agent, or Firm* — Vierra Magen Marcus & DeNiro LLP

(57) ABSTRACT

A system is disclosed for switching between synchronous and asynchronous network connections for implementing a turn-based multiplayer game. A network connection manager handles client device connections to set the connection to either an asynchronous network connection or a synchronous network connection. The connection manager may switch between the asynchronous and synchronous network connection modes based on a variety of triggering criteria.

20 Claims, 5 Drawing Sheets

SYSTEM FOR SYNCHRONOUS AND ASYNCHRONOUS GAMING MODES

BACKGROUND

Gaming systems have evolved from those which provided an isolated gaming experience to networked systems providing a rich, interactive experience which may be shared in real time between friends and other gamers. With Microsoft's Xbox® video game system and Xbox LIVE® online game service, multiple users in remote locations can participate together in a single game session.

The interactivity in some games is such that all players remain present and interact throughout the life of the game session. Combat-based games are one such example. These games are typically played over a synchronous network connection, which may remain open so that a central server pushes game state to all users continuously. Synchronous gaming may also occur via a peer-to-peer network connection where the players are communicating in real time with each other. In contrast, other games are played with far more latency, sometimes spanning long periods of time between actions. Turn-based games are such examples. In turn-based games, a user takes a turn and performs some action in the game, and then may need to wait for a responsive move from one or more other users in the game session before getting another turn.

Some turn-based games may be played via a synchronous network connection (either through a central server or via a peer-to-peer connection). However, given the latency between turns at times, this may result in an inefficient use of network bandwidth and resources, as well as adding expense in maintaining the connection. Some turn-based games may alternatively be played via an asynchronous network connection, where a central server maintains game state for an ongoing session, and users may intermittently login at different times, query data from the central server to learn the status of the game session and possibly to take additional actions. Asynchronous network connections work well for latent game sessions, but may be too slow, and result in inefficiencies in establishing and dropping network connections, when the pace of play speeds up.

SUMMARY

Embodiments of the present system relate to a system switching between synchronous and asynchronous network connections for implementing a turn-based multiplayer game. The system includes a gaming platform or service including one or more servers for processing gaming information and game state for one or more game applications. Client devices connect to the service via a network such as the Internet and join or start a game session. A network connection manager handles client device connections to set the connection to either an asynchronous network connection or a synchronous network connection. The connection manager may switch between the asynchronous and synchronous network connection modes based on a variety of triggering criteria. In one embodiment, the connection manager may switch a client from a synchronous network connection to an asynchronous network connection if the latency between turns in a game session the first client is playing exceeds a threshold. In embodiments, the network connection manager may switch the network connection from an asynchronous network connection to a synchronous network connection if, for example, a client receives a response within a predetermined period of time.

In embodiments, the present technology relates to a method of providing a network connection for clients to connect to a system to play a turn-based game session, the method comprising: a) setting the network connection for the gaming session to an asynchronous network connection if the latency between turns from two or more clients exceeds a first threshold; and b) setting the network connection to a synchronous network connection if the pace of play of the gaming session by the two or more clients in the gaming session exceeds a second threshold (i.e., the turns come in quickly).

In embodiments, the present technology relates to a method of providing a network connection for clients to connect to the system to play a turn-based game session, the method comprising: a) modifying the network connection for a first client from a synchronous network connection to an asynchronous network connection for the gaming session in the event a notification generated by actions from the first client are not successfully directly forwarded to at least one other client or if notification is successfully sent to at least one other client but a response from the at least one other client is not received within a predefined period of time; and b) modifying the network connection for the first client from an asynchronous network connection to a synchronous network connection for the gaming session if the first client has a notification awaiting them a predefined number of times upon the first client connecting to the system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology will now be explained with reference to FIGS. 1 through 4B, which in general relates to a system for switching between synchronous and asynchronous network connections for implementing a turn-based multiplayer game session. The present technology makes use of a connection manager for managing the network connection based on the pace of play of a turn-based game. When the latency between turns in a game session is above a threshold, the connection manager sets the connection to an asynchronous network connection supporting store and forward notifications of player actions. If a pace of the game speeds up, the connection manager is able to switch the connection to a synchronous network connection to facilitate near real-time, online interaction between players. If the pace slows down and/or the connection manager detects that players have dropped a network connection, the connection manager may again switch the connection mode to an asynchronous network connection. In this way, use of server resources is optimized for turn-based gaming based on the user need.

The present technology is explained in greater detail below with reference to a gaming application. However, it is understood that the present system for switching between synchronous and asynchronous modes to optimize user experience and use of server resources may be implemented in turn-based applications other than gaming applications in further embodiments.

Figure 1:
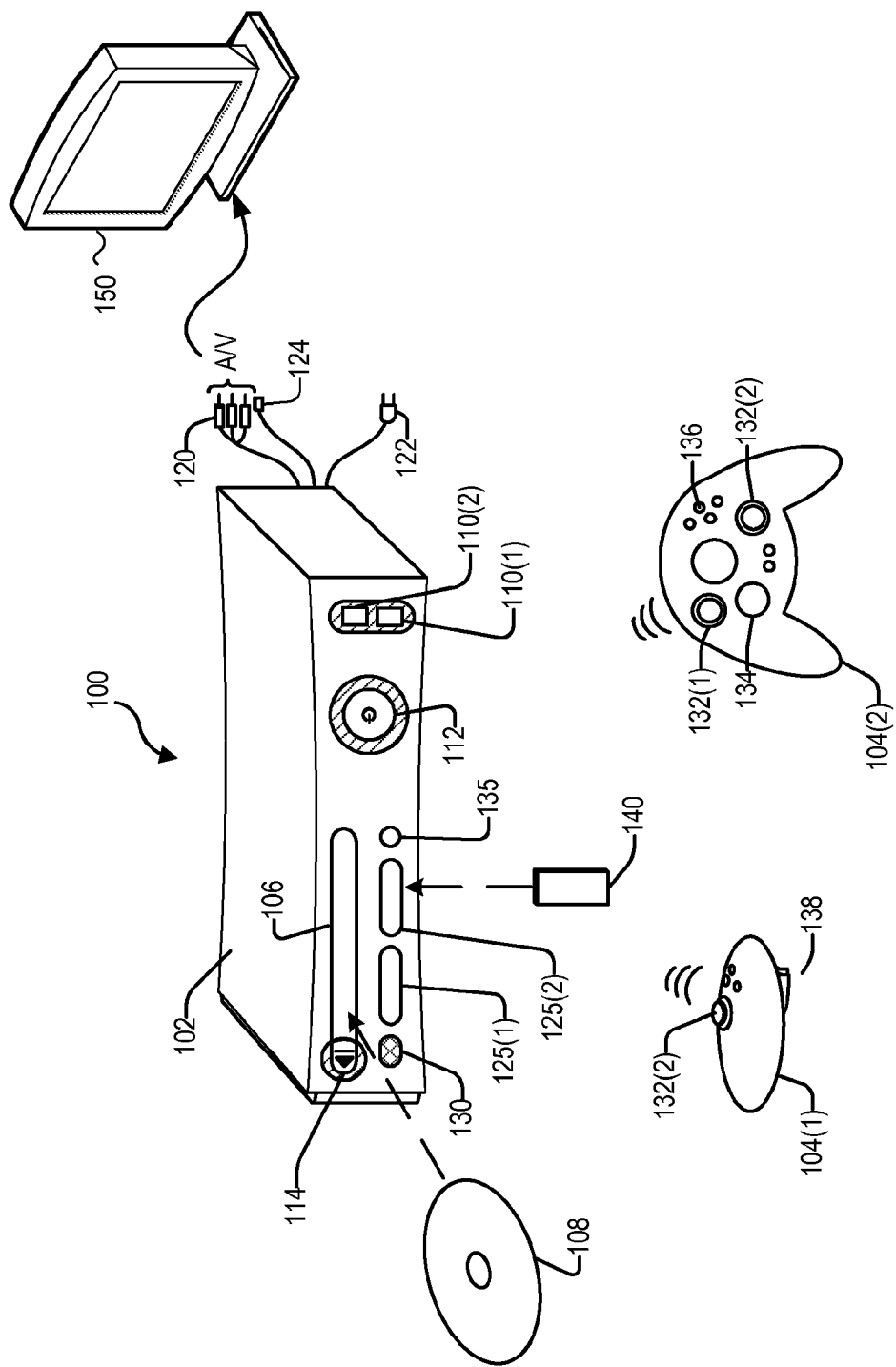
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. A sample of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controller 104 and display information on display 150. For example, console 102 can display a user interface on display 150 to allow a user to select a game using controller 104 and display achievement information as discussed below.

Figure 2:
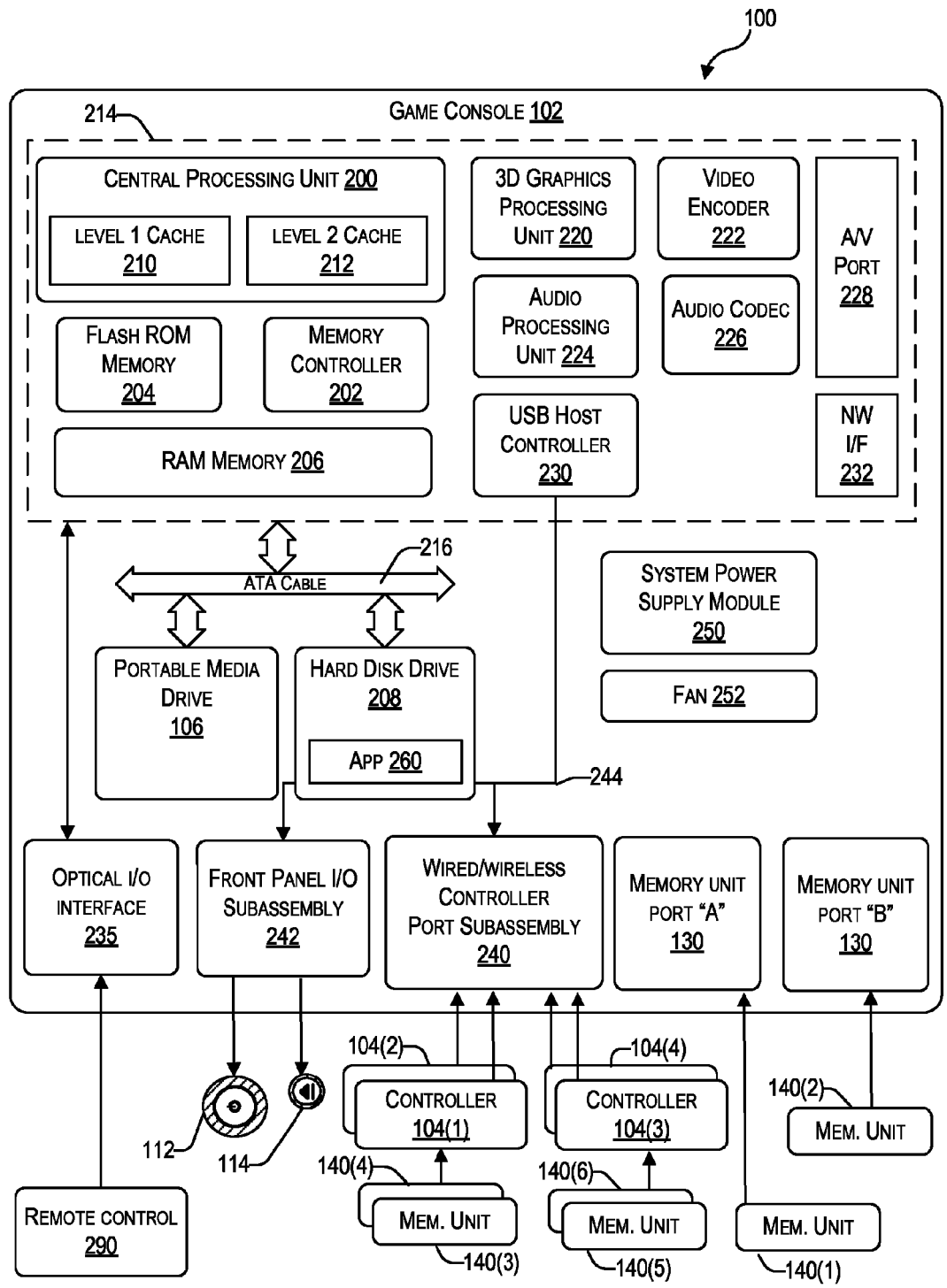
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wired or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming and media system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
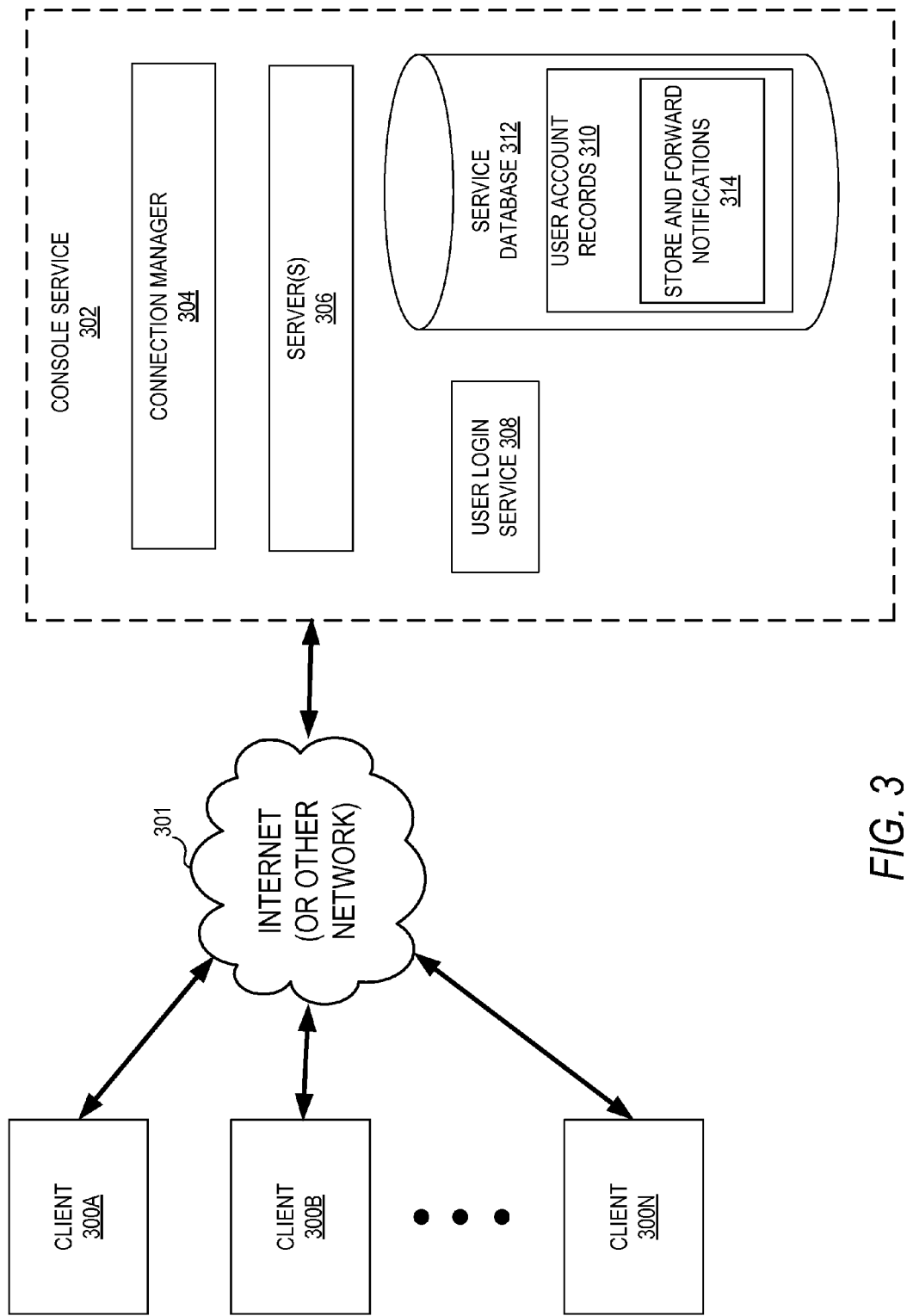
FIG. 3 is a block diagram of an exemplary operating environment for rendering achievement information.

FIG. 3 provides a block diagram of a system according to the present technology. Shown are clients 300A-300N networked with a service 302. Clients 300A-300N (referred simply as clients 300 hereinafter) may be the console 102 described above with respect to FIG. 2 or a variety of other computing devices. These computing devices may for example include personal computers, laptops, mobile handheld devices such as personal digital assistants and smart phones, as well as other devices. The service 302 includes a connection manager 304 and one or more servers 306. The servers 306 may host gaming applications to be played by users of clients 300. The gaming applications may alternatively be resident on the clients 300. The clients 300 connect to the console service 302 through a network 301. In accordance with the present technology, the connection manager 304 handles connections made by clients 300, and may maintain the connection between two or more clients 300 via network 301 to allow game play over a synchronous network connection. Alternatively, the connection manager may conduct a game session via an asynchronous connection where game state is maintained after a player takes a turn and drops the connection. The connection manager may be part of servers 306, or it may be a standalone computing environment is alternative embodiments. Further details relating to the operation of the connection manager 304 is set forth below.

In embodiments, the network 301 may comprise the Internet, though other networks such as LAN or WAN are contemplated. Server(s) 306 include a communication component capable of receiving information from and transmitting information to clients 300 via a synchronous network connection and an asynchronous network connection. The console service 302 also provides a collection of services that applications running on clients 300 may invoke and utilize.

For example, clients 300 may invoke user login service 308, which is used to authenticate a user on clients 300. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. It is understood that the above-described authentication process may vary in alternative embodiments. Any of a variety of authentication schemes may be employed to identify a users so that he or she may connect or reconnect to a gaming session. Once authenticated, user login service 308 stores the console identifier and the network path in user records 310 so that notifications and information may be sent to the client as explained below.

The user records may further keep store and forward notifications 314 relating to the state of a game session two or more clients are involved in together via an asynchronous network connection. In embodiments, notifications 314 may include additional information, such as for example messages exchanged between players. A store and forward notification may further be no more than that a given client connected at a given time. As explained below, where clients are engaged in a game session via a synchronous network connection, there is no need to store notifications regarding game state, as those notifications may be forwarded between clients, either peer-to-peer, or via a central server as explained hereinafter. However, in the event an attempt to forward a notification regarding game state is unsuccessful for any reason while clients are connected via a synchronous network connection, that notification may be stored as a store and forward notification 314 in user records 310. User records 310 can include additional information about a user associated with a client 300, such as game records, statistics and achievements, and a friends list. The above description relates to one embodiment of a network topology. Other topologies are contemplated. As one of many variations, store and forward notifications 314 may be stored on a separate server and/or at a different location.

Figure 4A:
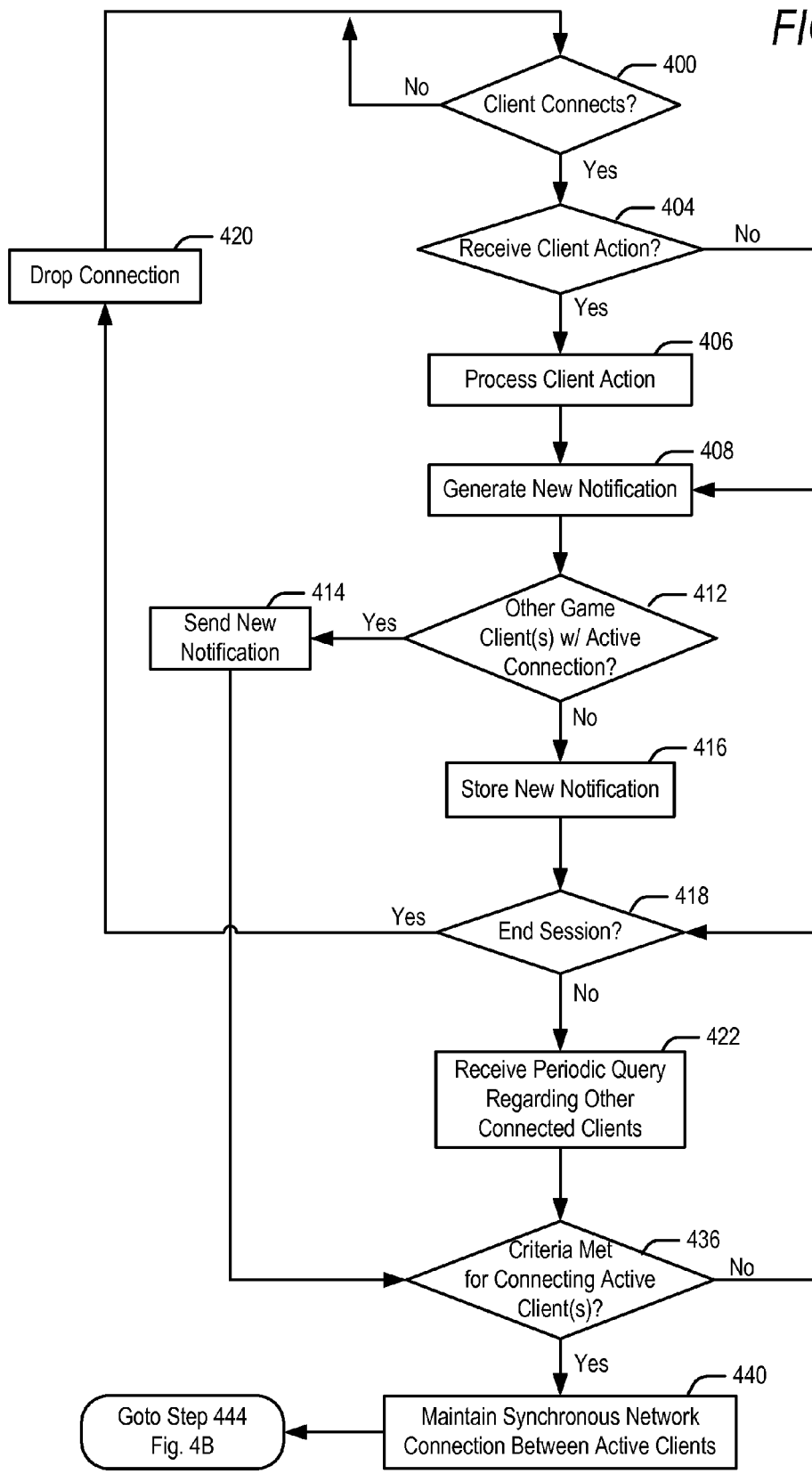
FIGS. 4A-4B are flow diagrams of a method for switching between synchronous and asynchronous network connections according to an embodiment of the present technology.
Figure 4B:
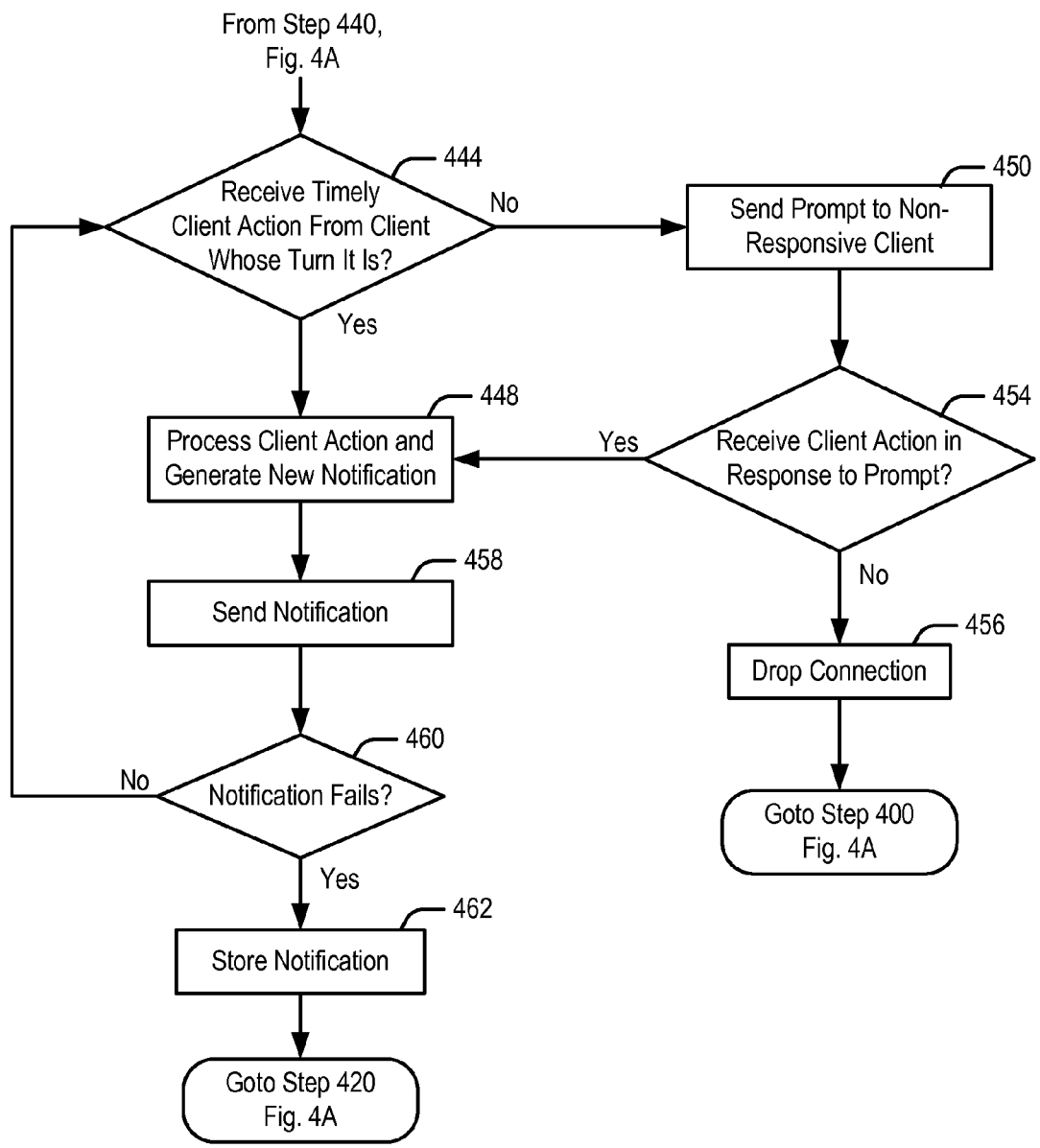

FIGS. 4A and 4B together show a flow diagram of a method of providing a turn-based game session, or other application, where the connection is controlled to be either a synchronous network connection or an asynchronous network connection based on the pace of the turn-based game/application. A turn-based game or application as used herein may encompass a wide variety of games and applications. In one embodiment, it may be a game with two or more players where the players alternate taking turns. Such games include for example chess, checkers and certain card games.

In another embodiment, the turns need not be taken sequentially, meaning that the players need not take their turn in a specific order. Each player may take one or more turns, not necessarily in a set order, and the server 306 will update game state for the session and send a notification to each player of the updated game state, thereafter allowing the players to take further turns. Such games may include massively multiplayer strategy and exploration games such as Diplomacy® and Civilization® type games. The pace of game may be dictated by the players or the game itself, and may vary from near continuous turns being taken to large periods of latency between turns, e.g., minutes, hours, days, etc.

Initially, a player using a client, for example client 300A, connects to the service 302. This may be to initiate a game session or for a player to return to a game session that has already begun. In either event, in this example, client 300A initially starts with an asynchronous network connection and is not initially synchronously connected to any other clients. The client authenticates itself and logs in. Thereafter, the game session may be launched. At that point, the client 300A is identified and associated with the game session, together with any other clients 300 participating in that gaming session. In step 400, the service 302 looks for a connection from the client 300A. Once a connection is made, the service 302 looks for one or more client actions in step 404 and, if found, the service 302 processes these client action(s) in step 406.

The client action(s) may for example be the client querying as to whether there are any stored notifications from other clients. As explained above, when the other player or players (300B and/or 300C, etc.) have taken their turn(s) in an asynchronously played game session, the gaming application processes the action taken by the other player(s) and stores the data which may be queried by the client 300A in step 404. Alternatively or additionally, the client action(s) may be the client 300A submitting a turn. The client may submit a turn in step 404 before or after checking for stored notifications and, in various embodiments, the client may submit a turn whether a stored notification is or is not waiting.

In step 406, the service 302 processes any client action taken in step 404. If the client 300A queried as to stored notifications, those notifications may be sent to the client 300A in step 406. Alternatively, if there are no stored notifications, the service may send a no-data reply in response to the client query. If, instead of or in addition to querying for notifications, the client 300A took a turn in the game in step 404, the service 302 may process that action in step 406. In particular, the game server 306 may process the client action to generate a new game state.

In step 408, a new notification is generated based on the client action received in step 404 and the processing of the action in step 406. If the client 300A merely queried stored notifications, the new notification generated in step 408 may reflect this. If the client took a turn, the new notification generated in step 408 may reflect the move client 300A made, and the updated game state. It is conceivable that client 300A connected, but did not query for stored notifications, did not take a turn and did not perform any further actions in step 404. In this instance, step 408 may still generate a notification indicating the client 300A connected at a given time. This new notification may be stored or sent out to the other player(s) if there are other players connected as explained below. In further embodiments, the service 302 may only generate a new notification in step 408 where the client took a turn in step 404. In such an embodiment, merely connecting or querying stored notifications may not generate a new notification in step 408.

The service 302 may next check in step 412 whether other clients to the game session are connected at the same time as client 300A. If so, the new notification generated by the action of client 300A may be sent to the one or more other connected clients in step 414. The connection manager 304 may then determine in step 436 whether certain synchronous connection criteria for establishing a synchronous connection between client 300A and the other connected client or clients are satisfied as explained below. If so, the connection manager 304 may maintain a synchronous connection between the connected clients in step 440 as is also explained below.

If, in step 412, it is determined that no other clients are connected, the new notification generated by the action of client 300A may be stored in step 416 in database 312. The client 300A may then choose to terminate the session in step 418. In this instance, the connection is dropped in step 420, and no further action is performed with respect to client 300A until client 300A again connects in step 400. In game sessions having more participants than clients 300A and 300B, notifications may be stored for such participants that are offline, and may be forwarded directly to those that are connected.

Instead of terminating the connection at step 418, the client 300A may instead choose to stay connected. For example, the client 300A may learn that there are no other clients connected, but the client 300A may stay connected for the purpose of periodically polling the service 302 to query whether other game session clients have connected. In step 422, the service 302 receives the periodic query from client 300A. Upon receiving a query from client 300A, the connection manager 304 determines whether the synchronous connection criteria are met in step 436 for connecting the client with one or more other game session clients. The synchronous connection criteria are explained below. If the criteria are satisfied, the connection manager maintains a synchronous connection between the connected game session clients. If the criteria are not satisfied, the service 302 may return to step 418 to see whether the client 300A wishes to terminate the connection or to continue polling the service 302 for other game session clients in step 422.

The periodic query received from the client in step 422 may be controlled by the connection manager 304 or the client, and may be performed according to a variety of schemes. In one embodiment, the frequency, or polling interval, with which a client polls the service 302 to look for notifications from other clients may vary with how often notifications are in fact waiting. Thus, in one embodiment (continuing with client 300A), the client 300A may poll one minute after the last query. If no notification is waiting, the client 300A may then wait two minutes before connecting again. If no notification is waiting after two minutes, the client 300A may wait four minutes before connecting again. If no notification is waiting after four minutes, the client 300A may wait ten minutes before connecting again. If no notification is waiting after ten minutes, the client 300A may wait a half hour before connecting again. And so on. The specific time periods mentioned above are by way of example only, and each polling interval may be longer or shorter than that set forth above.

If, at some point, a notification is found, the system may automatically reduce the polling interval back down to one minute for example. If the polling results in notifications which satisfy the synchronous connection criteria of step 436, the connection manager may then switch that client to a synchronous connection.

The above-described steps 400 through 422 may all occur via an asynchronous connection of the client 300A to the service 302. While the above description was set forth in terms of client 300A, it is understood that the above-described steps may apply to any client connecting to a game session through service 302.

The synchronous connection criteria of step 436 will now be described. If it was determined in step 412 that one or more additional game session clients were connected at the same time as client 300A, the synchronous connection criteria of step 436 may be no more than a message generated by the service 302 and sent to the connected clients letting them know that they are both connected, and asking whether they would like to continue the game session via a synchronous connection. If the connected clients respond in the affirmative, then the synchronous connection is maintained between the connected game session clients in step 440. In further embodiments, if it is determined that multiple game session clients are connected at the same time in step 412, the connection manager 304 may skip step 436 and may notify the connected game session clients that their game session is being maintained over a synchronous network connection.

As noted above, where it is determined that no other clients are connected at step 412, the client 300A may stay connected to periodically poll the service 302 to see if new notifications come in from other clients. If no stored notifications are found, the interval between successive queries may increase, whereas that interval may decrease once stored notifications are found. This interval may be controlled by the connection manager 304 or by a client 300 making the query. The connection manager 304 monitors these queries and found notifications, and determines in step 436 whether some "synchronous threshold" has been achieved. If so, the connection manager maintains a synchronous connection between two clients based on these interactions with the service 302.

The synchronous threshold on which this determination is made in step 436 may be defined in a number of ways. In one example mentioned above, the connection manager 304 may keep track of the frequency with which a client 300 playing a given game connects to the console service to look for stored notifications, and how often such stored notifications are found by that client. If the connection manager determines that some threshold percentage of the time the client connects there are unsent notifications upon connecting, the connection manager may switch the connection for that client to a synchronous connection in step 440. In this embodiment, the synchronous threshold is based on how often a client receives a notification when the client connects. In embodiments, that may vary from 20% to 80%, but the threshold percentage may be higher or lower than that in further embodiments.

In a further embodiment, instead of using a threshold percentage, the connection manager may switch to a synchronous connection if there were notifications awaiting a threshold number of prior connections in a row by the client. In this embodiment for example, a client may have connected any number of times where no notification was waiting, but following these attempts, if the client connects and there is a notification waiting each of a predetermined number of times in a row, for example two to four times, the connection manager may switch that client to a synchronous connection in step 440. The threshold number in this embodiment may be less than two or more than four in further embodiments.

In a further embodiment, the connection manager may simply look at the frequency with which different clients are taking their turns. If two clients are taking their turns within some threshold frequency, the connection manager may maintain a synchronous connection between them in step 440. The above described criteria for establishing a synchronous connection may be applied to two clients in a two person game session, or it may be applied to two or more clients of a larger group of clients, for example in a gaming session involving more than two players.

It is understood that the synchronous connection may be made through a central server which forms part of the service 302. However, it is understood that the synchronous connection may be made through a variety of other network schemes. The connection may for example be a peer-to-peer connection, or alternatively a synchronous connection may be made through a relay-type server.

Referring now to step 444 in FIG. 4B, after a synchronous connection has been established between two or more clients, the service next checks whether one of the clients having a turn timely responds. That is, when communicating via a synchronous network connection, the service may have a predefined "asynchronous threshold" time period within which it must receive a response from a client whose turn it is. The predefined asynchronous threshold time period may vary, but may for example be 15 seconds to five minutes, though it may be longer or shorter than that in further embodiments. If the client having a turn timely responds, the game session server 306 processes the client action and generates a new notification in step 448.

On the other hand, if no action is received from the client whose turn it is within the predefined asynchronous threshold time period, the service may generate a prompting message that is sent to the non-responsive client in step 450. If the non-responsive client does not respond to the prompt, again within some predefined time period such as above, the synchronous connection may be dropped in step 456. The flow may then return to step 400, FIG. 4A, to await the next connection by a client. The prompting steps 450 and 454 may be omitted in further embodiments, in which case the system will drop the connection in step 456 upon having not received a timely response in step 444.

If, on the other hand, the client having a turn timely responds in step 444, or timely responds to the prompt in step 454, the game session server 306 processes the client action and generates a new notification in step 448. In step 458, attempt is made to send the new notification directly to the other client(s) via the synchronous network connection. If the notification fails, the system stores the notification in step 462, and the flow returns to step 420 (FIG. 4A) where the synchronous network connection is dropped. The flow returns to step 400 and the game session is persisted over an asynchronous network connection until such time as the synchronous threshold is again reached. In this event, the connection manager may then switch the game session to a synchronous network connection.

On the other hand, if the notification is successful in step 460, the synchronous network connection is maintained. The service returns to step 444 to process further turns from all connected clients as described above. As long as client turns are taken within the asynchronous threshold period (or prompting period), and notifications are successfully sent, the system will support the clients playing the game session via a synchronous network connection. The flow returns to step 444 and the game session is persisted over a synchronous network connection until such time as the asynchronous threshold is reached, or the sending of a notification fails. The connection manager then switches the game session to an asynchronous network connection.

Given the above description, those of skill in the art will appreciate variations which may be made to the above described steps of FIGS. 4A and 4B without departing from the spirit of the invention. The above described steps of FIGS. 4A and 4B operate with two player turn-based games and more than two player turn-based games. Where there are more than two players, where one player drops a connection, the synchronous connection between remaining players may be persisted as long as one of such remaining players continues to take a turn as described above. If the game session reaches a point where action from a player who is offline is required, the synchronous connection for other players in the game session may be dropped until such time as two or more players are connected and able to play the game session at a pace above the synchronous threshold.

The above description was largely made in the context of a turn based system (it is A's turn than B's turn), but could be applied in a MMO where users are submitting data in parallel.

The present technology in general relates to a system for modifying a network connection from synchronous to asynchronous, and asynchronous to synchronous, to balance server performance and enhance the user experience. In embodiments described above, the switchover between the synchronous and asynchronous modes was based on pace of play. Given the above disclosure, those of skill in the art will appreciate other mechanisms on which the changeover may be triggered. In one such further embodiment, the gaming application itself may dictate that certain portions of the game be played by a synchronous network connection, while other portions of the game may be played by an asynchronous network connection. In a further embodiment, the user may set when and if the connection changes between the synchronous and asynchronous modes, by a setting in the system preferences. Other triggers may be possible in further embodiments.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. In a gaming and media system having a user interface including a display and a user interface selection device, a method of providing a network connection for clients to connect to the system to play a turn-based game session, the method comprising:
   (a) setting the network connection for the gaming session to an asynchronous network connection if the latency between turns from two or more clients exceeds a first threshold; and
   (b) setting the network connection to a synchronous network connection if the pace of play of the gaming session by the two or more clients in the gaming session exceeds a second threshold.

2. The method of claim 1, further comprising the step of generating notifications regarding a state of the game session.

3. The method of claim 2, further comprising the step of storing the notifications for a client at times when the network connection is set to asynchronous mode.

4. The method of claim 2, further comprising the step of forwarding the notifications for a client directly from a server to the client at times when the network connection is set to synchronous mode.

5. The method of claim 2, further comprising the step of forwarding the notifications for a first client directly from a second client to the first client in a peer-to-peer network at times when the network connection is set to synchronous mode.

6. The method of claim 1, said step (b) comprising the step of receiving periodic queries from a client to determine whether other clients have left notifications, and changing the connection from asynchronous to synchronous upon the queries and notifications satisfying predefined criteria.

7. The method of claim 6, the interval between periodic queries being set by one of a server through which queries are routed and the client making the queries.

8. The method of claim 1, said step (b) comprising the step of setting the network connection for a first client to a synchronous network connection in the event the first client has a notification waiting a predefined percentage of times the first client connects to the system and/or in the event the first client and a second client take an action in the turn-based game session within a predefined period of time.

9. The method of claim 1, said step (b) comprising the step of setting the network connection for a first client to a synchronous network connection in the event the first client has a notification waiting a predefined number of times in a row upon the first client connecting to the system.

10. In a gaming and media system having a user interface including a display and a user interface selection device, a method of providing a network connection for clients to connect to the system to play a turn-based game session, the method comprising:
   (a) modifying the network connection for a first client from a synchronous network connection to an asynchronous network connection for the gaming session in the event a notification generated by actions from the first client are not successfully directly forwarded to at least one other client or if notification is successfully sent to at least one other client but a response from the at least one other client is not received within a predefined period of time; and
   (b) modifying the network connection for the first client from an asynchronous network connection to a synchronous network connection for the gaming session if the first client has a notification awaiting them a predefined number of times upon the first client connecting to the system.

11. The method of claim 10, further comprising the step of storing the notifications for the at least one other client at times when the network connection is set to asynchronous mode or at times when the notification is not successfully forwarded to the at least one other client.

12. The method of claim 10, said step (a) comprising the step of modifying the network connection for a first client from a synchronous network connection to an asynchronous network connection for the gaming session in the event a response from the at least one other client is not received within a time period ranging between ten seconds and five minutes.

13. The method of claim 10, said step (b) comprising the step of setting the network connection for a first client to a synchronous network connection in the event the first client has a notification waiting a predefined percentage of times the first client connects to the system.

14. The method of claim 10, said step (b) comprising the step of setting the network connection for a first client to a synchronous network connection in the event the first client has a notification waiting a predefined number of times in a row upon the first client connecting to the system.

15. The method of claim 10, further comprising the step of sensing if there is at least one other client connected to the system at a time when the first client connects to the system, and sending a message the first and second clients relating to whether the first and second clients wish to play the game session via a synchronous network connection.

16. A gaming and media system comprising:
   at least one game server for processing game session information;
   a database for storing game session information; and
   a network connection manager, the network connection manager managing the network connection to change the network connection for the gaming session from a synchronous network connection to an asynchronous network connection if the latency between turns from two or more clients exceeds a threshold, and the network connection manager managing the network connection to change the network connection for the gaming session from an asynchronous network connection to a synchronous network connection if a first client has a notification waiting a predefined number of times upon the first client connecting to the system and/or in the event the first client and a second client take an action in the gaming session within a predefined period of time.

17. The gaming and media system of claim 16, the database storing a notification of changes in game state resulting from actions of the first client in the event the notification is not directly delivered via a synchronous network connection.

18. The gaming and media system of claim 16, the network manager setting the network connection for the first client to an asynchronous network connection in the event an action is required from a client which has not responded within the threshold period of time.

19. The gaming and media system of claim 16, the network manager setting the network connection for the first client to synchronous network connection in the event the first client has a notification waiting one of a predefined percentage of times the first client connects to the system, and a predefined number of times in a row that the first client connects to the system and/or in the event the first client and a second client take an action in the gaming session within a predefined period of time.

20. The gaming and media system of claim 16, the network manager setting the network connection for the first client to synchronous network connection in the event the first client and one other client playing the gaming session are connected to the system, and the first client and one other client indicate that they wish to play the gaming session via a synchronous network connection.

* * * * *